(12) United States Patent
Beydaghi et al.

(10) Patent No.: US 10,603,639 B2
(45) Date of Patent: Mar. 31, 2020

(54) NANOCOMPOSITE BLEND MEMBRANE

(71) Applicants: Hossein Beydaghi, Tehran (IR);
Mehran Javanbakht, Tehran (IR);
Parisa Salarizadeh, Kerman (IR);
Ahmad Bagheri Kharepouei, Qazvin (IR); Ali Amoo Zadeh, Semnan (IR)

(72) Inventors: Hossein Beydaghi, Tehran (IR);
Mehran Javanbakht, Tehran (IR);
Parisa Salarizadeh, Kerman (IR);
Ahmad Bagheri Kharepouei, Qazvin (IR); Ali Amoo Zadeh, Semnan (IR)

( * ) Notice: Subject to any disclaimer, the term of this patent is extended or adjusted under 35 U.S.C. 154(b) by 134 days.

(21) Appl. No.: 15/684,907

(22) Filed: Aug. 23, 2017

(65) Prior Publication Data

US 2017/0348648 A1    Dec. 7, 2017

Related U.S. Application Data

(60) Provisional application No. 62/382,784, filed on Sep. 2, 2016.

(51) Int. Cl.
*B01D 71/68* (2006.01)
*B01D 71/08* (2006.01)
(Continued)

(52) U.S. Cl.
CPC ......... *B01D 71/08* (2013.01); *B01D 67/0079* (2013.01); *B01D 69/148* (2013.01); *B01D 71/52* (2013.01); *B01D 71/68* (2013.01); *B01D 71/76* (2013.01); *B01D 71/82* (2013.01); *C01G 41/02* (2013.01); *C08F 14/22* (2013.01); *C08F 16/06* (2013.01); *C08F 28/02* (2013.01); *C08G 65/3344* (2013.01); *C08G 65/4012* (2013.01); *C08L 71/00* (2013.01);
*C08L 81/06* (2013.01); *H01M 8/1011* (2013.01); *H01M 8/1032* (2013.01); *H01M 8/1039* (2013.01);
(Continued)

(58) Field of Classification Search
CPC ........ B01D 71/08; B01D 71/52; B01D 71/68; B01D 71/76; B01D 71/82; C08F 14/22; C08L 71/00; C08L 81/06; H01M 8/1032; H01M 8/1011; H01M 8/1039
USPC ........................................... 429/493
See application file for complete search history.

(56) References Cited

U.S. PATENT DOCUMENTS 7,405,015 B2    7/2008  Xiao et al.
7,678,863 B2    3/2010  Gao et al.
(Continued)

OTHER PUBLICATIONS

Inan et al, "Sulfonated Peek and fluorinated polymer based blends for fuel cell applications: Investigation of the effect of type and molecular weight of the fluorinated polymers on the membrane's properties", International Journal of Hydrogen Energy, 35, 12038-12053. (Year: 2010).*

(Continued)

*Primary Examiner* — Amanda C. Walke
(74) *Attorney, Agent, or Firm* — Bajwa IP Law Firm; Haris Zaheer Bajwa

(57) ABSTRACT

A nanocomposite blend membrane and fabrication methods for making the nanocomposite membrane are disclosed. The nanocomposite blend membrane can be utilized in fuel cells. The nanocomposite blend membrane may include a blend polymer with a first sulfonated polymer and a second sulfonated polymer, as well as sulfonated tungsten trioxide ($WO_3$) nanoparticles.

7 Claims, 13 Drawing Sheets

(51) Int. Cl.
  B01D 71/52    (2006.01)
  C01G 41/02    (2006.01)
  C08F 28/02    (2006.01)
  C08F 16/06    (2006.01)
  C08F 14/22    (2006.01)
  B01D 71/82    (2006.01)
  B01D 71/76    (2006.01)
  B01D 67/00    (2006.01)
  C08L 71/00    (2006.01)
  C08G 65/334   (2006.01)
  C08G 65/40    (2006.01)
  B01D 69/14    (2006.01)
  C08L 81/06    (2006.01)
  H01M 8/1011   (2016.01)
  H01M 8/1032   (2016.01)
  H01M 8/1039   (2016.01)
  B01D 71/32    (2006.01)
  B01D 71/38    (2006.01)
  B01D 71/34    (2006.01)

(52) U.S. Cl.
  CPC ............ B01D 71/32 (2013.01); B01D 71/34 (2013.01); B01D 71/38 (2013.01); C01P 2002/72 (2013.01); C01P 2004/03 (2013.01); C08G 2650/40 (2013.01)

(56) References Cited

U.S. PATENT DOCUMENTS

| | | | |
|---|---|---|---|
| 8,486,579 B2 | 7/2013 | Huang et al. | |
| 2006/0034757 A1* | 2/2006 | Yan | B01D 67/0051 423/707 |
| 2006/0141316 A1 | 6/2006 | Kang | |
| 2011/0027692 A1* | 2/2011 | Sugitani | C08J 5/2275 429/493 |
| 2011/0136016 A1* | 6/2011 | Huang | C08G 65/48 429/309 |
| 2012/0178834 A1* | 7/2012 | Linder | B01D 67/0006 521/27 |
| 2017/0179558 A1* | 6/2017 | McKone | H01M 8/188 |

OTHER PUBLICATIONS

Boroglu et al, "Synthesis and characterization of poly(vinyl alcohol) proton exchange membranes modified with 4,4-diaminodiphenylether-2,2-disulfonic acid", eXPRESS Polymer Letters, vol. 5, 470-478. (Year: 2011).*

Sonpingkam et al, "Mechanical Properties of Sulfonated Poly (Ether Ether Ketone) Nanocomposite Membranes", International Journal of Chemical Engineering and Applications, vol. 5, No. 2, 181-185. (Year: 2014).*

Bagheri et al, "Sulfonated poly(etheretherketone) and sulfonated polyvinylidene fluoride-co-hexafluoropropylene based blend proton exchange membranes for direct methanol fuel cell applications", Royal Society of Chemistry, 6, 39500-39510. (Year: 2016).*

Amoozadeh et al, "Nano-WO3-supported sulfonic acid: New, efficient and high reusableheterogeneous nano catalyst", Journal of Molecular Catalysis A: Chemical, 396, 96-107. (Year: 2015).*

Yi-Ming Sun, Sulfonated poly (phthalazinone ether ketone) for proton exchange membranes in direct methanol fuel cells, ournal of membrane science, 2005, vol. 265, Issue 1, pp. 108-114.

Yan Gao, Synthesis and characterization of sulfonated poly (phthalazinone ether ketone) for proton exchange membrane materials, Journal of Polymer Science Part A: Polymer Chemistry, vol. 41, Issue 4, 2003, pp. 497-507.

Suparna Das, Partial sulfonation of PVdF-co-HFP: a preliminary study and characterization for application in direct methanol fuel cell, Applied Energy 2014, vol. 113, pp. 169-177.

Yan Gao, Proton exchange membranes based on sulfonated poly (phthalazinone ether ketone) s/aminated polymer blends, Solid State Ionics, 2005, vol. 176, Issue 3, pp. 409-415.

Ming Wang, Sulfonated Poly (Phthalazinone Ether Sulfone Ketone)/ Poly (Vinylidene Fluoride) Blend Membranes for Direct Methanol Fuel Cell, ECS Transactions, 2009, vol. 17, Issue 1, pp. 503-510.

Shuang Gu, Preparation and characterization of poly (vinylidene fluoride)/sulfonated poly (phthalazinone ether sulfone ketone) blends for proton exchange membrane, Journal of applied polymer science, 2010, vol. 116, Issue 2, pp. 852-860.

Suzhen Ren, Ren, Suzhen, et al. Sulfonated poly (ether ether ketone)/polyvinylidene fluoride polymer blends for direct methanol fuel cells, Materials Letters, 2006, vol. 60, Issue 1, pp. 44-47.

J. Wootthikanokkhan, Methanol permeability and properties of DMFC membranes based on sulfonated PEEK/PVDF blends, Journal of applied polymer science, 2006, vol. 102, Issue 6, pp. 5941-5947.

Appadurai Uma Devi, Highly selective sulfonated poly (vinylidene fluoridecohexafluoropropylene)/poly (ether sulfone) blend proton exchange membranes for direct methanol fuel cells, Journal of Applied Polymer Science, Sep. 20, 2016, vol. 133, Issue 36.

M. Sankara Subramanian, Sulfonated polyether sulfonepoly(vinylidene fluoride) blend membrane for DMFC applications, Journal of Applied Polymer Science, 2010, vol. 117, Issue 2, pp. 801-808.

* cited by examiner

NANOCOMPOSITE BLEND MEMBRANE

CROSS-REFERENCE TO RELATED APPLICATION

This application claims the benefit of priority from U.S. Provisional Patent Application Ser. No. 62/382,784, filed on Sep. 2, 2016, and entitled "NANOCOMPOSITE BLEND MEMBRANES WITH FUNCTIONALIZED NANOPARTICLES," which is incorporated herein by reference in its entirety.

TECHNICAL FIELD

The present disclosure generally relates to membranes, and particularly to a nanocomposite blend membrane for fuel cells.

BACKGROUND

In recent years, fuel cells have become increasingly popular, as they provide a promising sustainable approach in addressing the ongoing energy crisis and associated environmental concerns. Fuel cells have been used as sources of power for a wide range of applications that require clean, quiet, and efficient portable power.

Fuel cells convert the chemical potential energy of a fuel into electrical energy via an electrochemical reaction. A fuel cell may include a cathode and an anode, as well as a proton exchange membrane ("PEM"). PEMs typically perform two basic functions: first, a PEM serves as a separator, preventing mixing of the fuel (i.e., hydrogen or methanol) and the oxidant (i.e., pure oxygen or air); and second, the PEM provides an electrolyte for transporting protons from the anode to the cathode. PEMs have become the subject of increasing research in recent years due to their important function in fuel cells.

For best results in fuel cells, PEMs must have not only high proton conductivity but also high electronic resistivity. In addition, the PEMs should have low reactant permeation, mechanical strength under both dry and humidified circumstances, and thermal and chemical stability under fuel cell operation conditions. Most alternative-PEM materials are based on perfluorinated polymers such as Nafion and various sulfonated derivatives of non-fluorinated aromatic high-performance polymers.

A variety of PEMs are known and used in the art, but are typically high cost and/or suffer from serious disadvantages, such as high methanol permeation or dehydration at high temperatures, or they simply do not have the required efficiency. Therefore, there is a need in the art for a more economical PEM, which is also free from these disadvantages.

SUMMARY

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure describes a nanocomposite blend membrane including sulfonated tungsten trioxide ($SWO_3$) nanoparticles and a blend polymer. The blend polymer may include a first sulfonated polymer and a second sulfonated polymer.

The above general aspect may have one or more of the following features. The first sulfonated polymer can be sulfonated poly (phthalazinone ether ketone) (SPPEK). In some other implementations, the first sulfonated polymer can be selected from sulfonated poly (ether ether ketone) (SPEEK), sulfonated poly (sulfone), sulfonated poly (ether sulfone), sulfonated poly (arylene ether sulfone) or sulfonated poly (aryl ether ketone). Furthermore, in some cases, the second sulfonated polymer can be sulfonated polymer, such as sulfonated Poly(vinylidene fluoride-co-hexafluoropropylene) (SPVDF-co-HFP). In some other implementations, the second sulfonated polymer can be selected from sulfonated Poly (vinylidene fluoride) (SPVDF) and sulfonated poly (vinyl alcohol) (SPVA). In some implementations where the nanocomposite blend membrane includes a sulfonated poly (phthalazinone ether ketone) (SPPEK)/sulfonated Poly(vinylidene fluoride-co-hexafluoropropylene) (SPVDF-co-HFP) membrane, a maximum proton conductivity of the SPPEK/SPVDF-co-HFP membrane at room temperature is approximately 0.071 S cm-1, a tensile strength of the SPPEK/SPVDF-co-HFP membrane at room temperature is approximately 52 MPa, a percent elongation at break the SPPEK/SPVDF-co-HFP membrane at room temperature is approximately 8.5%, and/or a methanol permeability of the SPPEK/SPVDF-co-HFP membrane at room temperature is approximately 0.95 (cm2 s−1)×10-7.

In another general aspect, the present disclosure is directed to a method for fabricating a nanocomposite blend membrane. The method may include steps of preparing sulfonated $WO_3$ nanoparticles; preparing a first solution of a first sulfonated polymer; preparing a second solution of a second sulfonated polymer; preparing a third solution including the first solution, the second solution, and the sulfonated $WO_3$ nanoparticles; and casting the third solution to obtain a nanocomposite blend membrane.

The above general aspect may have one or more of the following features. According to one implementation, preparing sulfonated $WO_3$ nanoparticles may include the steps of mixing an ammonia solution and a first cetyltrimethylammonium bromide (CTAB) solution to obtain a primary solution; adding tungsten hexachloride $WCl_6$ to a second CTAB solution to obtain a secondary solution; mixing the primary solution and the secondary solution to obtain a tertiary solution; and aging the tertiary solution. In some cases, preparing sulfonated $WO_3$ nanoparticles further includes the steps of calcinating the aged tertiary solution to obtain $WO_3$ nanoparticles; mixing the obtained $WO_3$ nanoparticles and dry dichloromethane in a vessel; purging HCl gas into the vessel; adding chlorosulfonic acid into the vessel; and reducing the pressure of the vessel to remove dichloromethane and to obtain a powder of $SWO_3$ nanoparticles. In some implementations, preparing the first solution of the first sulfonated polymer includes the steps of adding poly (phthalazinone ether ketone) (PPEK) powder to concentrated sulfuric acid to obtain a PPEK sulfuric acid solution; pouring the PPEK sulfuric acid solution into chilled water, such as ice-water; and drying the PPEK sulfuric acid solution and chilled water solution to obtain dried sulfonated poly (phthalazinone ether ketone) (SPPEK). In another implementation, preparing the second solution of the second sulfonated polymer includes the steps of drying Poly(vinylidene fluoride-co-hexafluoropropylene) (PVDF-co-HFP) pellets in a vacuum oven; heating a solution of chlorosulfonic acid; adding the dried PVDF-co-HFP pellets to the heated chlorosulfonic acid to obtain black pellets; washing the black pellets; and vacuum drying the black pellets to obtain sulfonated Poly(vinylidene fluoride-co-hexafluoropropylene) (SPVDF-co-HFP). In addition, in some cases, preparing the third solution includes the steps of: dissolving a first quantity of dried SPPEK in dimethyl-acetamide (DMAc) to obtain an SPPEK and DMAc solution; dissolving a second quantity of SPVDF-co-HFP in DMAc separately to obtain an SPVDF-co-HFP and DMAc solution; mixing the SPPEK and DMAc solution with the SPVDF-co-HFP and DMAc solution to obtain a blend polymer solution; and adding $SWO_3$ nanoparticles to the blend polymer solution, thereby obtaining an SPPEK/SPVDF-co-HFP/SWO3 solution. Furthermore, casting the third solution to obtain the nanocomposite blend membrane can include the steps of casting the SPPEK/SPVDF-co-HFP/$SWO_3$ solution onto a plate and drying the SPPEK/SPVDF-co-HFP/$SWO_3$ solution casted onto the plate. In some cases, drying the SPPEK/SPVDF-co-HFP/$SWO_3$ solution casted onto the plate further includes first, drying the SPPEK/SPVDF-co-HFP/$SWO_3$ solution at approximately room temperature for a first period of time; second, drying the SPPEK/SPVDF-co-HFP/$SWO_3$ solution at approximately 70° C. for a second period of time; and third, drying the SPPEK/SPVDF-co-HFP/$SWO_3$ solution at approximately 120° C. for a third period of time.

In another general aspect, the present disclosure is directed to a method for fabricating a blend membrane. The method can include preparing a first solution of a first sulfonated polymer; preparing a second solution of a second sulfonated polymer; preparing a third solution including the first solution and the second solution; and casting the third solution to obtain a blend membrane.

The above general aspect may have one or more of the following features. For example, preparing the first solution of the first sulfonated polymer may include the steps of adding poly (phthalazinone ether ketone) PPEK powder to concentrated sulfuric acid to obtain a PPEK and sulfuric acid solution; pouring the PPEK and sulfuric acid solution into chilled water to produce a PPEK sulfuric acid and chilled water solution; and drying the PPEK sulfuric acid and chilled water solution to obtain dried sulfonated poly (phthalazinone ether ketone) (SPPEK). In some implementations, preparing the second solution of the second sulfonated polymer includes the steps of drying Poly(vinylidene fluoride-co-hexafluoropropylene) (PVDF-co-HFP) pellets in a vacuum oven; heating a solution of chlorosulfonic acid; adding the dried PVDF-co-HFP pellets to the heated chlorosulfonic acid to obtain resultant pellets; and vacuum drying the resultant pellets to obtain sulfonated Poly(vinylidene fluoride-co-hexafluoropropylene) (SPVDF-co-HFP). In addition, in some examples, preparing the third solution includes the steps of dissolving a first quantity of dried sulfonated poly (phthalazinone ether ketone) SPPEK in dimethylacetamide (DMAc) to obtain an SPPEK and DMAc solution; dissolving a second quantity of sulfonated Poly(vinylidene fluoride-co-hexafluoropropylene) SPVDF-co-HFP in DMAc separately to obtain an SPVDF-co-HFP and DMAc solution; and mixing the SPPEK and DMAc solution with the SPVDF-co-HFP and DMAc solution to obtain a blend polymer solution including a SPPEK/SPVDF-co-HFP solution. In another implementation, casting the third solution to obtain the nanocomposite blend membrane includes the steps of casting the SPPEK/SPVDF-co-HFP solution onto a plate and drying the SPPEK/SPVDF-co-HFP solution casted onto the plate.

Other systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the following claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As noted above, fuel cells have increased in popularity as a source of energy. The fuel cell typically includes a cathode and an anode, as well as a proton exchange membrane ("PEM"). The present disclosure is directed to systems and methods for polymer or nanocomposite blend membranes which may be used in proton exchange membranes (PEMs) for fuel cells. Some benefits from these features may include, but are not limited to, providing a membrane with reduced methanol permeability, good proton conductivity, high selectivity, and improved mechanical integrity. The following description provides details regarding such polymer and nanocomposite blend membranes and their fabrication.

Preparation of a Polymer Blend Membrane

Figure 1:
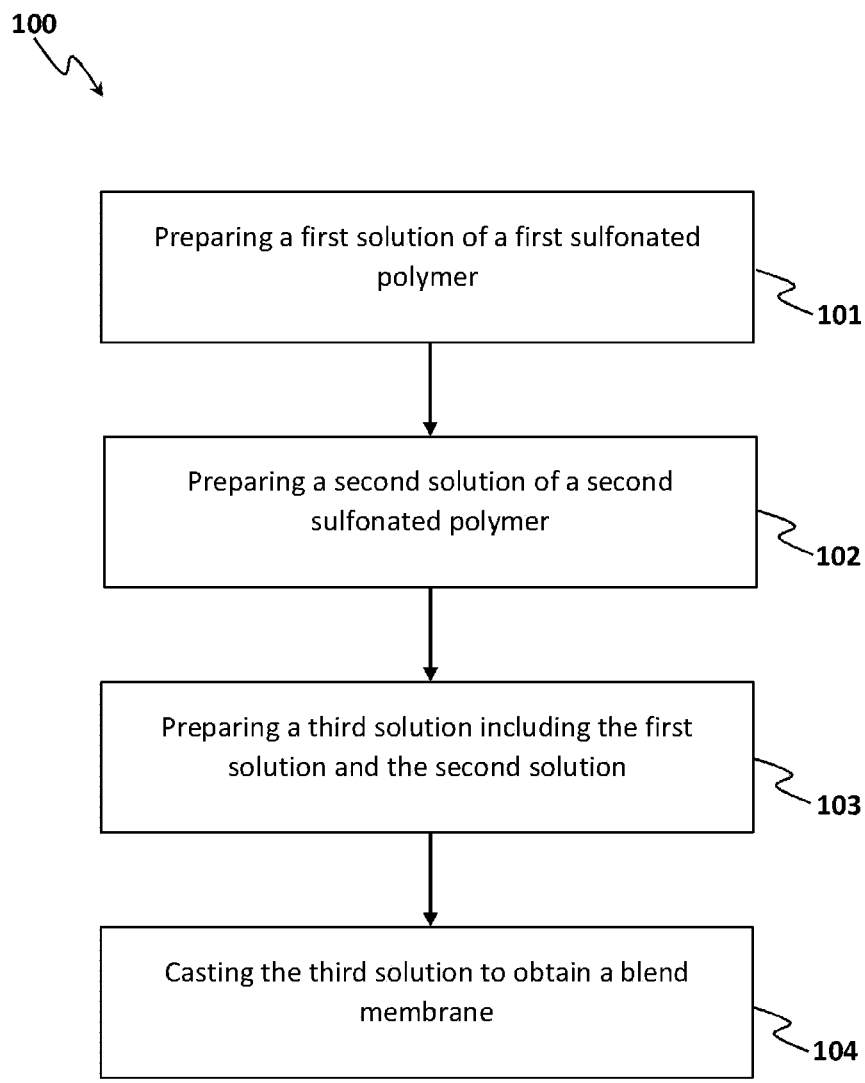
FIG. 1 illustrates a flowchart of an implementation of a method for fabricating a blend membrane.

FIG. 1 illustrates a flowchart of an implementation of a method of fabricating a blend membrane. As shown in FIG. 1, in one implementation, the method 100 includes a first step 101 of preparing a first solution of a first sulfonated polymer. In a second step 102, a second solution of a second sulfonated polymer can be prepared. A third step 103 includes preparing a third solution including the first solution and the second solution. In a fourth step 104, the third solution is cast to obtain a blend membrane. Additional details regarding the method 100 are discussed below.

Referring again to first step 101, in some implementations, the first sulfonated polymer may include SPPEK, sulfonated poly (ether ether ketone) (SPEEK), sulfonated poly (sulfone), sulfonated poly (ether sulfone), sulfonated poly (arylene ether sulfone) and sulfonated poly (aryl ether ketone). Furthermore, in one implementation, the sulfonated polymer can include sulfonated poly (phthalazinone ether ketone) (SPPEK), which in some implementations can be obtained by sulfonation of poly (phthalazinone ether ketone) (PPEK) polymer. In some cases, the sulfonation of PPEK may include the steps of (1) mixing sulfuric acid and PPEK; (2) heating the solution of PPEK and sulfuric acid; (3) stirring the heated solution of PPEK and sulfuric acid for a predetermined time in a nitrogen atmosphere; and/or (4) mixing the PPEK and sulfuric acid solution with ice-water to obtain SPPEK polymer as the first sulfonated polymer. In another implementation, a first quantity of dried SPPEK may be dissolved in dimethylacetamide (DMAc) to obtain an SPPEK solution as the first solution of the first sulfonated polymer.

Referring next to second step 102, in some implementations, the second sulfonated polymer may include sulfonated Poly(vinylidene fluoride-co-hexafluoropropylene) (SPVDF-co-HFP), sulfonated Poly (vinylidene fluoride) (SPVDF) and sulfonated poly (vinyl alcohol) (SPVA). In one implementation, SPVDF-co-HFP may be obtained by sulfonation of Poly(vinylidene fluoride-co-hexafluoropropylene) (PVDF-co-HFP) polymer. In some cases, the sulfonation of PVDF-co-HFP may include the steps of: (1) drying PVDF-co-HFP pellets; (2) heating a chlorosulfonic acid solution; (3) adding the dried PVDF-co-HFP pellets to the chlorosulfonic acid solution to obtain resultant pellets, which can also be referred to as black pellets herein; (4) washing the obtained black pellets with 1,2-dichloroethane, methanol and deionized water; and/or (5) vacuum drying the black pellets to obtain SPVDF-co-HFP as the second sulfonated polymer. In another implementation, a quantity of SPVDF-co-HFP may be dissolved in DMAc to obtain an SPVDF-co-HFP and DMAc solution as the second solution of the second sulfonated polymer.

With respect to third step 103, in some implementations, the first solution of first step 101 and the second solution of second step 102 may be mixed in order to obtain a third solution. In one implementation, during fourth step 104, the third solution may be casted onto a clean glass plate or other casting plate to obtain an SPPEK/SPVDF-co-HFP blend membrane.

Preparing a Nanocomposite Blend Membrane

Figure 2:
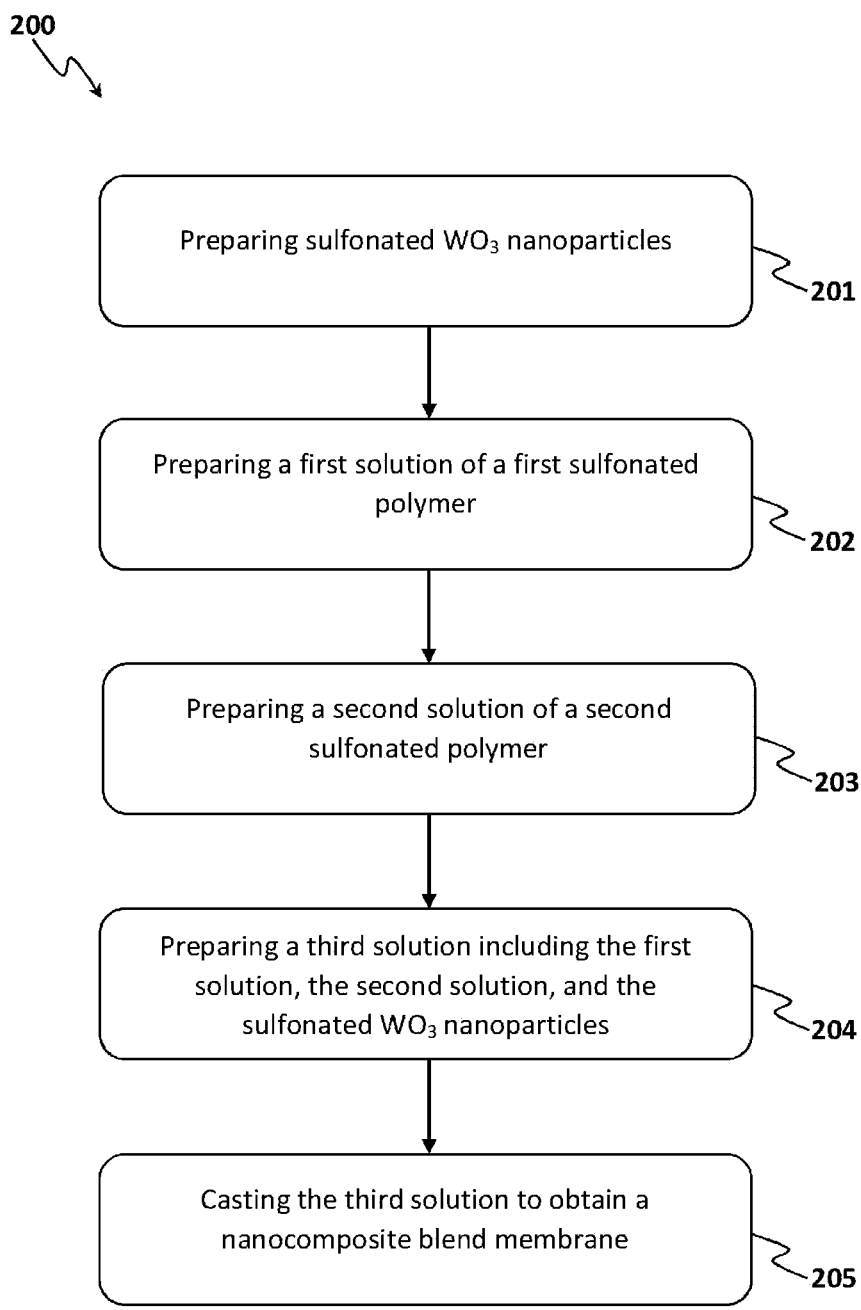
FIG. 2 illustrates a flowchart of an implementation of a method for fabricating a nanocomposite blend membrane.

Referring now to FIG. 2, a flowchart of an implementation of a method of fabricating a nanocomposite blend membrane is presented. As shown in FIG. 2, in some implementations, the method 200 includes a first step 201 of preparing sulfonated tungsten trioxide (SWO$_3$) nanoparticles with suitable catalytic activity, as well as a second step 202 of preparing a first solution of a first sulfonated polymer. In addition, the method 200 includes a third step 203 of preparing a second solution of a second sulfonated polymer. A fourth step 204 involves preparing a third solution that includes the first solution (of second step 202), the second solution (of third step 203), and sulfonated WO$_3$ nanoparticles. During a fifth step 205, casting the third solution occurs to obtain a nanocomposite blend membrane. Additional details regarding the method 200 are discussed below.

Referring back to first step 201, in some implementations, sulfonated WO$_3$ nanoparticles may be obtained by the sulfonation of tungsten trioxide (WO$_3$) nanoparticles. In one implementation, the preparation of WO$_3$ nanoparticles may include the steps of: (1) mixing an ammonia solution and a cetyltrimethylammonium bromide (CTAB) solution to obtain a primary solution; (2) mixing tungsten hexachloride (WCl$_6$) and CTAB solution to obtain a secondary solution; (3) mixing the primary solution and the secondary solution to obtain a tertiary solution; (4) aging the tertiary solution; and/or (4) calcinating the aged tertiary solution to obtain WO$_3$ nanoparticles.

In another implementation, the synthesized WO$_3$ nanoparticles may be sulfonated using chlorosulfonic acid to obtain sulfonated WO$_3$ nanoparticles. In some other implementations, the preparation of sulfonated WO$_3$ nanoparticles may include the steps of: (1) mixing the obtained WO$_3$ nanoparticles and dry dichloromethane; (2) purging HCl gas in to the solution of WO$_3$ nanoparticles and dichloromethane; (3) adding chlorosulfonic acid into the solution of WO$_3$ nanoparticles and dichloromethane; and/or (4) reducing the pressure to remove dichloromethane and to obtain a dark green powder of sulfonated WO$_3$ nanoparticles.

In implementations of the second step 202, the first sulfonated polymer may include SPPEK, sulfonated poly (ether ether ketone) (SPEEK), sulfonated poly (sulfone), sulfonated poly (ether sulfone), sulfonated poly (arylene ether sulfone) and sulfonated poly (aryl ether ketone). In one implementation, SPPEK may be obtained by sulfonation of PPEK polymer. In some cases, the sulfonation of PPEK may include the steps of: (1) mixing sulfuric acid and PPEK; (2) heating the solution of PPEK and sulfuric acid; (3) stirring the heated solution of PPEK and sulfuric acid for a predetermined time in a nitrogen atmosphere; and (4) mixing the PPEK and sulfuric acid solution with ice-water to obtain SPPEK polymer as the first sulfonated polymer. In one implementation, a quantity of dried SPPEK may be dissolved in DMAc to obtain an SPPEK and DMAc solution as the first solution of the first sulfonated polymer.

Referring next to third step 203, in some implementations, the second sulfonated polymer may include SPVDF-co-HFP, sulfonated Poly (vinylidene fluoride) (SPVDF) and sulfonated poly (vinyl alcohol) (SPVA). In one implementation, SPVDF-co-HFP may be obtained by sulfonation of PVDF-co-HFP polymer. In some cases, the sulfonation of PVDF-co-HFP may include the steps of: (1) drying PVDF-co-HFP pellets; (2) heating a chlorosulfonic acid solution; (3) adding the dried PVDF-co-HFP pellets to the chlorosulfonic acid solution to obtain black pellets; (4) washing the obtained black pellets with 1,2-dichloroethane, methanol and deionized water; and/or (5) vacuum drying the black pellets to obtain SPVDF-co-HFP as the second sulfonated polymer. In one implementation, a quantity of SPVDF-co-HFP may be dissolved in DMAc to obtain an SPVDF-co-HFP and DMAc solution as the second solution of the second sulfonated polymer.

With respect to the fourth step 204, in some implementations, the sulfonated $WO_3$ nanoparticles, the first solution (of second step 202), and the second solution (of third step 203) may be mixed to obtain a third solution. In an implementation of fifth step 105, the third solution may be casted onto a clean glass plate or other casting surface to obtain a nanocomposite blend membrane.

Example 1

Fabrication of an SPPEK/SPVDF-Co-HFP/$SWO_3$ Membrane

In Example 1, an SPPEK/SPVDF-co-HFP/$SWO_3$ membrane was fabricated pursuant to the teachings of the present disclosure. In this case, the SPPEK/SPVDF-co-HFP/$SWO_3$ membrane is composed of sulfonated $WO_3$ nanoparticles ($SWO_3$) and an SPPEK/SPVDF-co-HFP blend polymer.

For the preparation of $WO_3$ nanoparticles, approximately 10 mL of an ammonia solution with a concentration of approximately 25 wt % was added to a cetyltrimethylammonium bromide (CTAB) solution and stirred to obtain a primary solution. In addition, approximately 0.117 mole of $WCl_6$ was added to approximately 1000 mL of CTAB solution to obtain a secondary solution. The secondary solution was then added to the primary solution to obtain a tertiary solution. The tertiary solution was stirred for about another 4 hours and aged for approximately 72 hours at room temperature. The aged tertiary solution was then filtered and washed with deionized water and ethanol, and calcinated at approximately 500° C. for about 2 hours to obtain $WO_3$ nanoparticles.

The synthesized $WO_3$ nanoparticles were sulfonated using chlorosulfonic acid. For this reason, 4 grams of the prepared $WO_3$ and 20 mL of dry dichloromethane were added to a vessel. In addition, HCl gas was purged into the vessel, while 1 mL of chlorosulfonic acid was substantially simultaneously added in a drop-wise manner into the solution over a period of about 30 minutes at a temperature of approximately 25° C. while the solution was being stirred. After adding the chlorosulfonic acid, the HCL flow was cut, and the product was stirred for another 30 minutes. The pressure was reduced to remove dichloromethane from the product in order to obtain a dark green powder of $SWO_3$ nanoparticles. Finally, the $SWO_3$ nanoparticles were washed with ethanol and dried at about 70° C.

SPPEK was obtained by direct sulfonation of PPEK, with sulfuric acid. As a first step, approximately 2 grams of PPEK powder was slowly added to approximately 20 milliliters of concentrated sulfuric acid while stirring the solution. The solution was then stirred for another hour at about 25° C. After substantially complete dissolution of the PPEK, the solution temperature was raised to about 60° C. under a nitrogen atmosphere and was continuously stirred for approximately 4 hours, and then cooled to about 25° C. The solution was poured into a large container of ice-water and then stirred. The resulting product was washed with deionized water until neutral pH was obtained and was dried at approximately 70° C. for 24 hours in a vacuum oven to obtain dried SPPEK. The degree of sulfonation (DS) of the dried SPPEK was calculated to be about 68% using a titration method.

Sulfonation of PVDF-co-HFP was conducted in presence of chlorosulfonic acid. The PVDF-co-HFP pellets were first dried in a vacuum oven for a period of about 12 hours at a temperature of approximately 60° C. Meanwhile, 20 milliliters of chlorosulfonic acid was heated at 60° C. in a round-bottom flask. The dried PVDF-co-HFP pellets were added to the acid solution and the solution was stirred. After about 7 hours, the resulting black pellets were collected and washed subsequently with 1,2-dichloroethane, methanol and deionized water, and were vacuum dried at 60° C. to obtain SPVDF-co-HFP. The DS of the obtained SPVDF-co-HFP was calculated to be approximately 31% using a titration method.

In order to prepare a polymer solution with 10 wt % concentration of polymer blend (SPPEK:SPVDF-co-HFP=80:20), a suitable quantity of dried SPPEK was dissolved in dimethylacetamide (DMAc) at 60° C. by stirring for about 6 hours to obtain an SPPEK/DMAc solution. Suitable weight ratios of SPVDF-co-HFP were dissolved in DMAc in the same condition separately to obtain an SPVDF-co-HFP/DMAc solution. The SPPEK/DMAc solution and SPVDF-co-HFP/DMAc solution were combined and stirred for about 6 hours at 60° C. to obtain a blend polymer solution. Finally, an appropriate amount of $SWO_3$ nanoparticles were added to the blend polymer solution and sonicated for approximately 1 hour to obtain a SPPEK/SPVDF-co-HFP/$SWO_3$ solution. The SPPEK/SPVDF-co-HFP/$SWO_3$ solution was casted onto a clean glass plate, and dried at approximately room temperature for a first period of time, and then heated at a temperature of approximately 70° C. for a second period of time, and finally it was dried at a temperature of approximately 120° C. for a third period of time to obtain an SPPEK/SPVDF-co-HFP/$SWO_3$ nanocomposite blend membrane. In different implementations, the first period of time and the second period of time can be substantially similar, though in other implementations, they can differ. In one implementation the first period of time and/or the second period of time can range between 4 hours and 20 hours, while in other implementations, they can be about 12 hours. In some cases, the first period of time and/or the second period of time can each be at least 12 hours. In addition, the third period of time can be less than either the first period of time and the second period of time in some implementations. In one implementation, the third period of time is about 2 hours. In other implementations, the third period of time is at least 20 minutes, and can be greater than 12 hours.

The thickness of the prepared nanocomposite blend membranes varied in the range of 50 μm to 100 μm. The as-prepared SPPEK/SPVDF-co-HFP/$SWO_3$ nanocomposite blend membrane is hereinafter referred to as $M_{SSW_x}$ where x presents the weight percentage of $SWO_3$ nanoparticles in the membrane.

Example 2

Fabrication of an SPPEK/SPVDF-co-HFP Membrane

In this example, an SPPEK/SPVDF-co-HFP blend membrane is fabricated pursuant to the teachings of the present disclosure. SPPEK was obtained by direct sulfonation of PPEK. In a first step, 2 grams of PPEK powder was slowly added to about 20 milliliters of concentrated sulfuric acid while stirring the solution. The solution was then stirred for another hour at 25° C. After a substantially complete dissolution of PPEK, the solution temperature was raised to 60°

C. under a nitrogen atmosphere and continuously stirred for 4 hours, and then cooled to 25° C. The solution was then poured into a large excess of ice water while stirred. The resulting product was washed with deionized water until neutral pH was obtained and dried at 70° C. for about 24 hours in a vacuum oven. The DS of the obtained SPPEK was calculated to be approximately 68% using a titration method.

Sulfonation of PVDF-co-HFP was conducted in the presence of chlorosulfonic acid. First, PVDF-co-HFP pellets were dried in a vacuum oven for a period of 12 hours at a temperature of 60° C. Meanwhile, 20 milliliters of chlorosulfonic acid was heated at 60° C. in a round-bottom flask. The dried PVDF-co-HFP pellets were added to the acid solution carefully under a stirring condition. After about 7 hours, the resulting black pellets were collected and washed subsequently with 1,2-dichloroethane, methanol and deionized water, respectively, and vacuum dried at about 60° C. to obtain SPVDF-co-HFP. The DS of the obtained SPVDF-co-HFP was calculated to be approximately 31% by the titration method.

In order to prepare a polymer solution with 10 wt % concentration of polymer blend (SPPEK:SPVDF-co-HFP=80:20), a suitable quantity of dried SPPEK was dissolved in DMAc in 60° C. by stirring for about 6 hours to obtain an SPPEK/DMAc solution. In addition, suitable weight ratios of SPVDF-co-HFP were dissolved in DMAc in the same condition separately and then added to the SPPEK/DMAc solution and stirred for about 6 hours at 60° C. in order to obtain an SPPEK/SPVDF-co-HFP solution. The resulting SPPEK/SPVDF-co-HFP solution was casted onto a clean glass plate, and dried at approximately room temperature for about 12 hours, then heated at approximately 70° C. for about 12 hours and then at approximately 120° C. for about 2 hours to obtain an SPPEK/SPVDF-co-HFP membrane. In other examples, each time period for drying can vary widely, as discussed above with respect to Example 1. The thickness of different prepared membranes was between 50-100 μm. The as-prepared SPPEK/SPVDF-co-HFP blend membrane is hereinafter referred to as $M_{SS}$.

Example 3

Fabrication of an SPPEK Membrane

In Example 3, SPPEK was obtained by direct sulfonation of PPEK. In a first step, 2 grams of PPEK powder was slowly added to 20 milliliters of concentrated sulfuric acid while stirring the solution. The solution was then stirred for another hour at about 25° C. After complete dissolution of PPEK, the solution temperature was raised to 60° C. under a nitrogen atmosphere, stirred continuously for about 4 hours, and cooled to 25° C. The solution was then poured into a large excess of ice water while stirred. The resulting product was washed with deionized water until neutral pH was obtained and dried at approximately 70° C. for 24 hours in a vacuum oven to obtain an SPPEK membrane. The DS of the obtained SPPEK was calculated to be approximately 68% using titration method. The as-prepared SPPEK membrane is hereinafter referred to as the $M_S$ membrane.

Example 4

Characterization Tests

In this example, the results of some characterization tests performed on the SPPEK/SPVDF-co-HFP/SWO$_3$ nanocomposite blend membrane, the SPPEK/SPVDF-co-HFP blend membrane, and the SPPEK membrane (prepared as described in detail in connection with Examples 1, 2 and 3) are presented.

Figure 3:
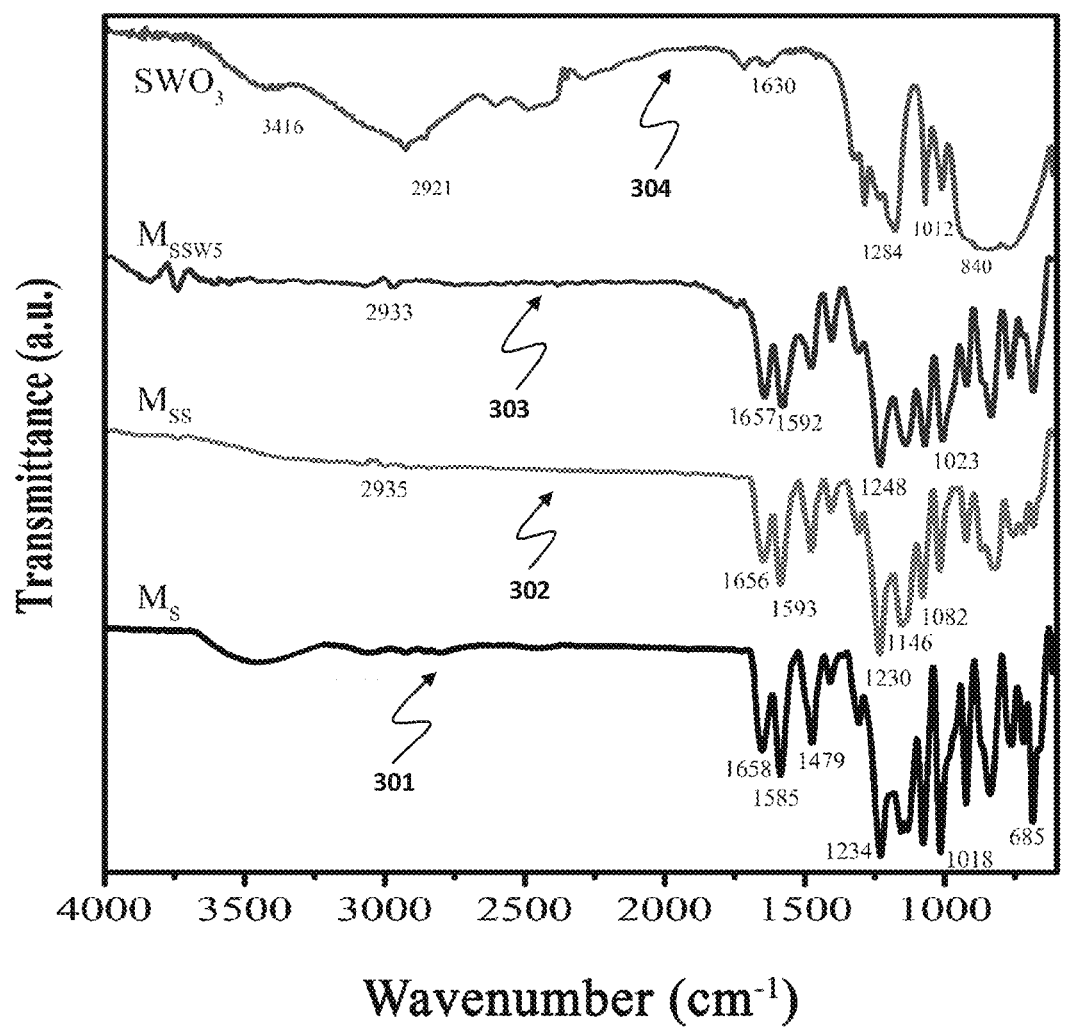
FIG. 3 illustrates a Fourier transform infrared spectroscopy (FTIR) spectra of an implementation of the SPPEK membrane ($M_S$), the SPPEK/SPVDF-co-HFP membrane ($M_{SS}$), the SPPEK/SPVDF-co-HFP/$SWO_3$ ($M_{SSW5}$) membrane and $SWO_3$ nanoparticles.

Referring to FIG. 3, a Fourier transform infrared (FTIR) spectra of the SPPEK membrane ($M_S$) membrane 301, the SPPEK/SPVDF-co-HFP membrane ($M_{SS}$) 302, the SPPEK/SPVDF-co-HFP/SWO$_3$ ($M_{SSW5}$) membrane 303, and the SWO$_3$ nanoparticles 304 is shown. In FIG. 3, the FTIR spectra of SWO$_3$ nanoparticles indicates the presence of stretching vibration of —OH group (3416 cm$^{-1}$) and O=S=O (1012 cm$^{-1}$ symmetric and 1284 cm$^{-1}$ asymmetric stretching modes) confirming the presence of —SO$_3$H groups in the structure of SWO$_3$ nanoparticles. Furthermore, the absorbance peaks at around 840 and 1630 cm$^{-1}$ are due to W—O—W vibration and W—OH vibration in the structure of the SWO$_3$ nanoparticles. For the $M_S$ membrane, the peaks at 1234 and 1479 cm$^{-1}$ can be attributed to the presence of C—O—C and C—C bonds in the SPPEK aromatic ring. The absorbance peaks at 1018, 1082, 1146 cm$^{-1}$ can be attributed to the symmetric and asymmetric stretching vibration of O=S=O and stretching vibration of S=O bonds, which confirm the presence of —SO$_3$H groups in the structure of SPPEK. In addition, the absorbance peaks at 1585 and 1658 cm$^{-1}$ can be associated with the presence of carbonyl groups and C=N bands in the structure of SPPEK polymer. Moreover, $M_{SS}$ and $M_{SSW5}$ membranes show an adsorption band at 2935 cm$^{-1}$ and 2933 cm$^{-1}$, which is consistent with the —CH$_2$ groups of SPVDF-co-HFP chains.

Figure 4:
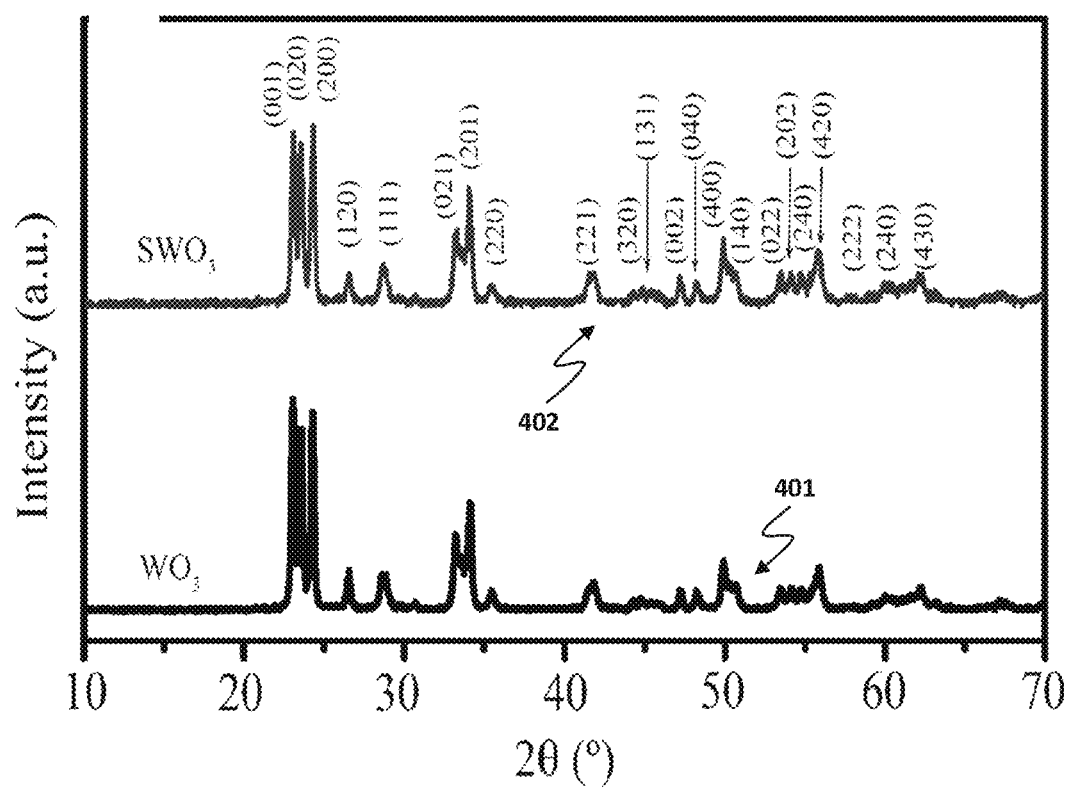
FIG. 4 illustrates an X-ray diffraction (XRD) plot of an implementation of $WO_3$ nanoparticles and $SWO_3$ nanoparticles.
Figure 5A:
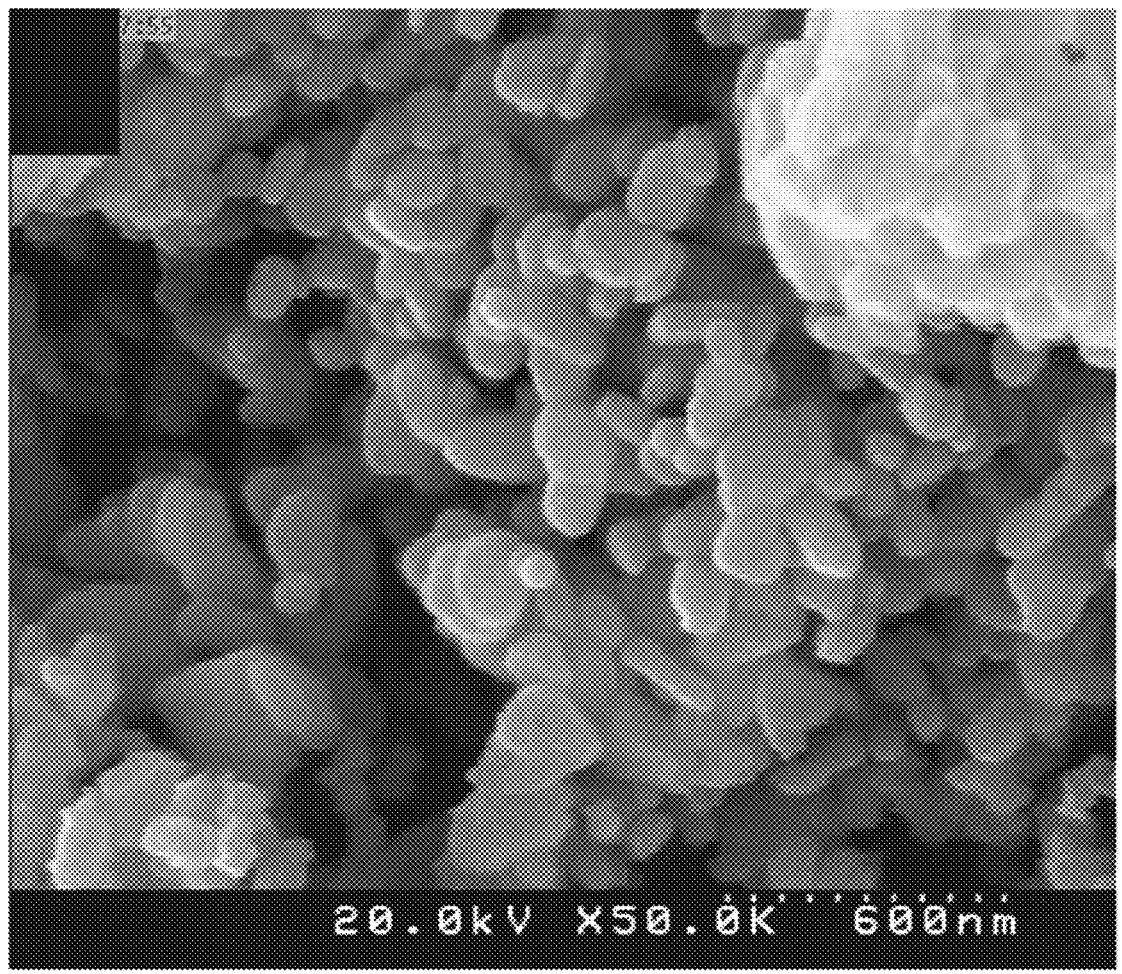
FIG. 5A illustrates a scanning electron microscope (SEM) image of an implementation of $WO_3$ nanoparticles with an image resolution of 600 nanometers.
Figure 5B:
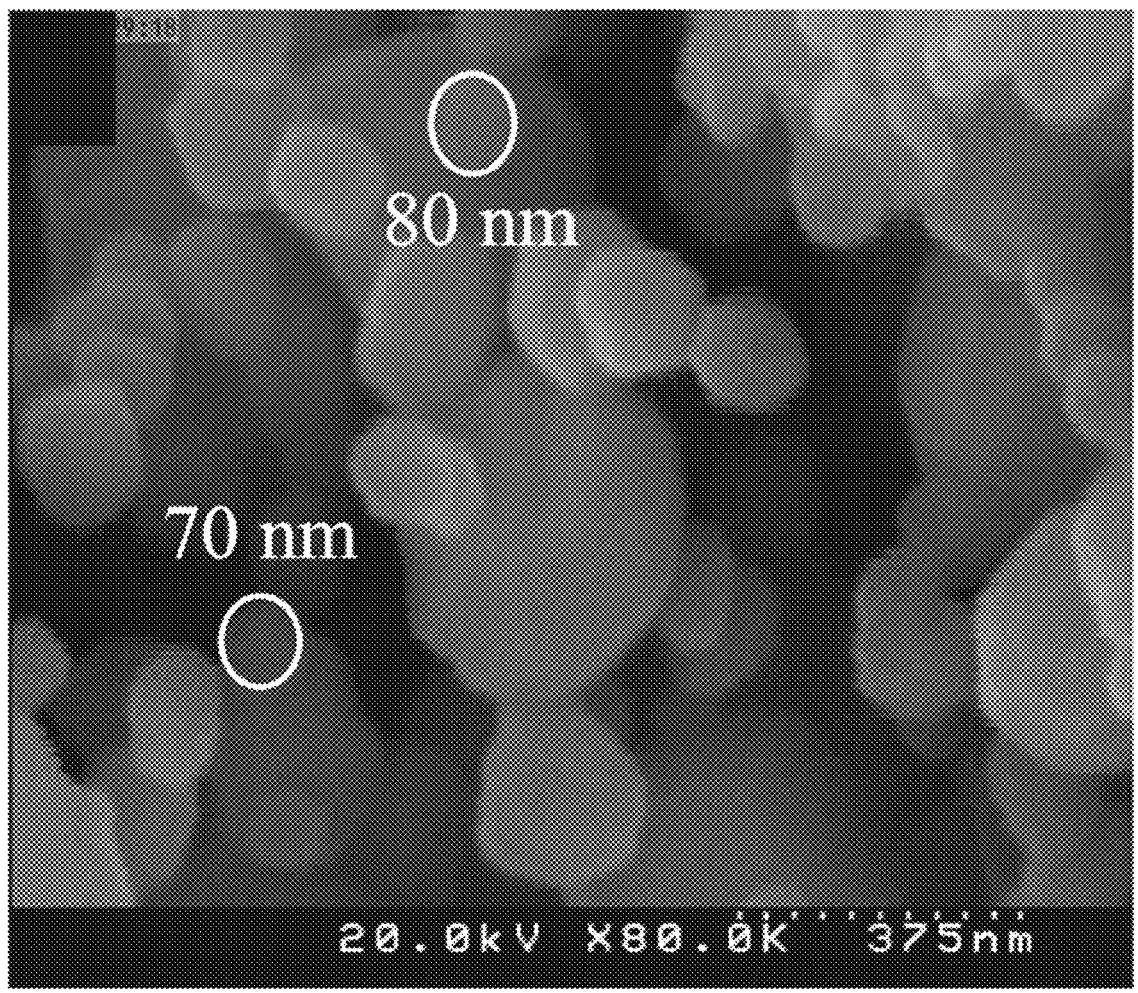
FIG. 5B illustrates a scanning electron microscope (SEM) image of an implementation of $WO_3$ nanoparticles with an image resolution of 375 nanometers.
Figure 5C:
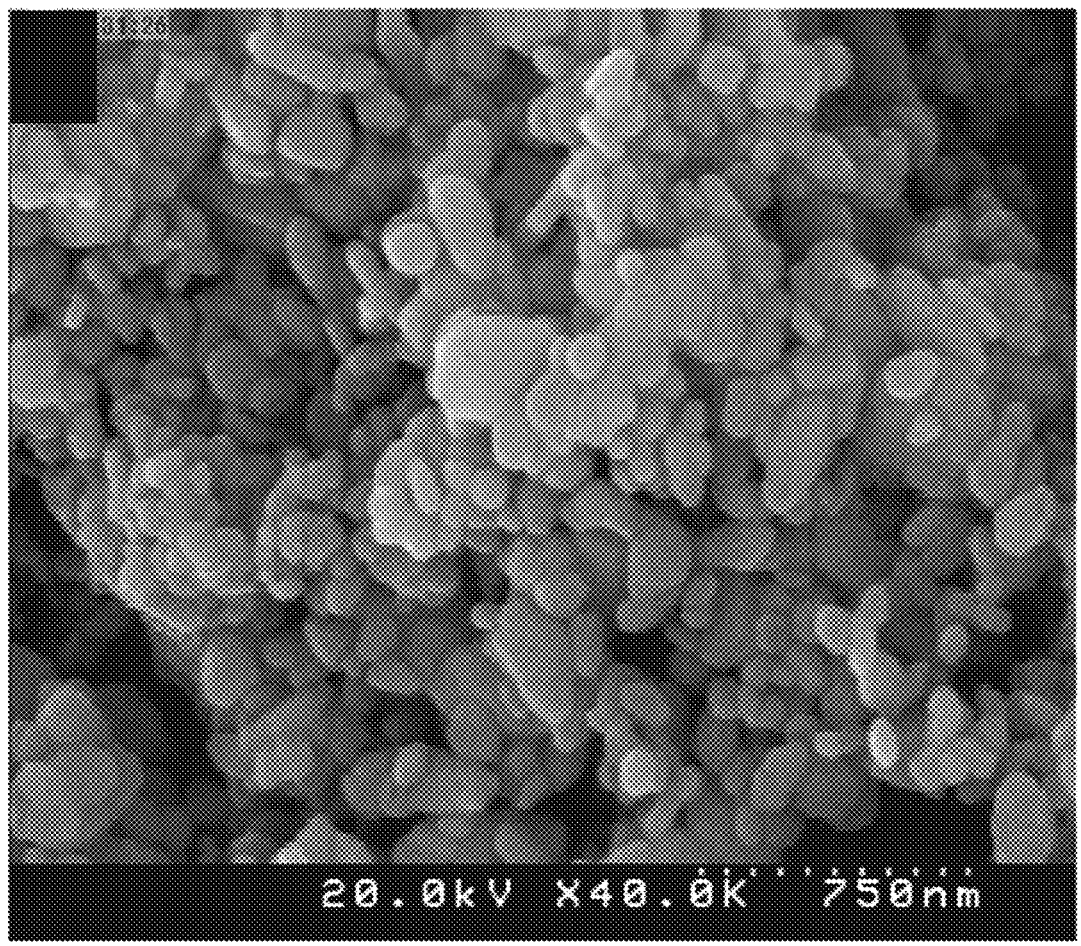
FIG. 5C illustrates a scanning electron microscope (SEM) image of an implementation of $SWO_3$ nanoparticles with an image resolution of 750 nanometers.
Figure 5D:
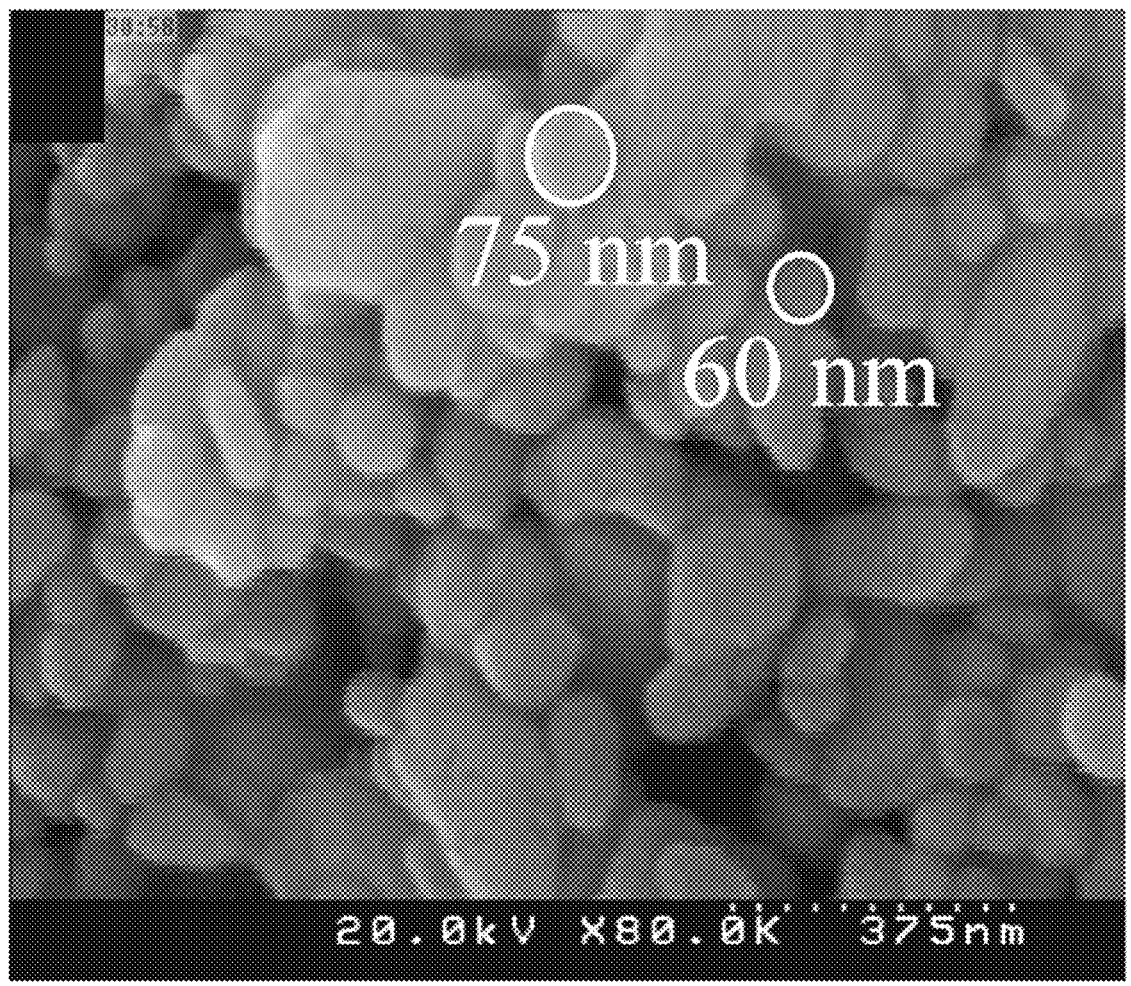
FIG. 5D illustrates a scanning electron microscope (SEM) image of an implementation of $SWO_3$ nanoparticles with an image resolution of 375 nanometers.

Referring next to FIG. 4, an X-ray diffraction (XRD) plot of WO$_3$ nanoparticles 401 and SWO$_3$ nanoparticles 402 is shown. In FIG. 4, it can be seen that for the WO$_3$ nanoparticles, diffraction peaks (001), (020), (200), (120), (111), (021), (201), (220), (221), (320), (131), (002), (040), (400), (140), (022), (202), (240), (420), (222), (240), and (430) facets of the crystal planes of WO$_3$ nanoparticles coincide with the JCPD 201324 standard. The average crystal size of the WO$_3$ and SWO$_3$ nanoparticles were determined to be approximately 21.67 nm and 20.52 nm using the Debye-Scherrer formula (t=0.9λ/B$_{1/2\,cos}$ θ), where t is the average crystal size, λ is the X-ray wavelength (1.54 Å), B$_{1/2}$ is the angular line width at half maximum intensity and θ is the Bragg's angle. In addition, SWO$_3$ nanoparticles show diffraction patterns similar to WO$_3$ nanoparticles, indicating that the sulfonation process does not change the phase of WO$_3$ nanoparticles.

In FIGS. 5A-5D, a series of scanning electron microscopy (SEM) images are presented. The SEM images for WO$_3$ nanoparticles are presented in FIGS. 5A and 5B and SEM images for SWO$_3$ nanoparticles are presented in FIGS. 5C and 5D. In FIGS. 5A-5D, the SEM images show substantially spherical WO$_3$ and SWO$_3$ nanoparticles with an average particle size of about 75-80 nm and 60-75 nm, respectively. The uneven surface of SWO$_3$ nanoparticles compared to WO$_3$ nanoparticles can be understood to indicate that the modification process was performed successfully.

Figure 6A:
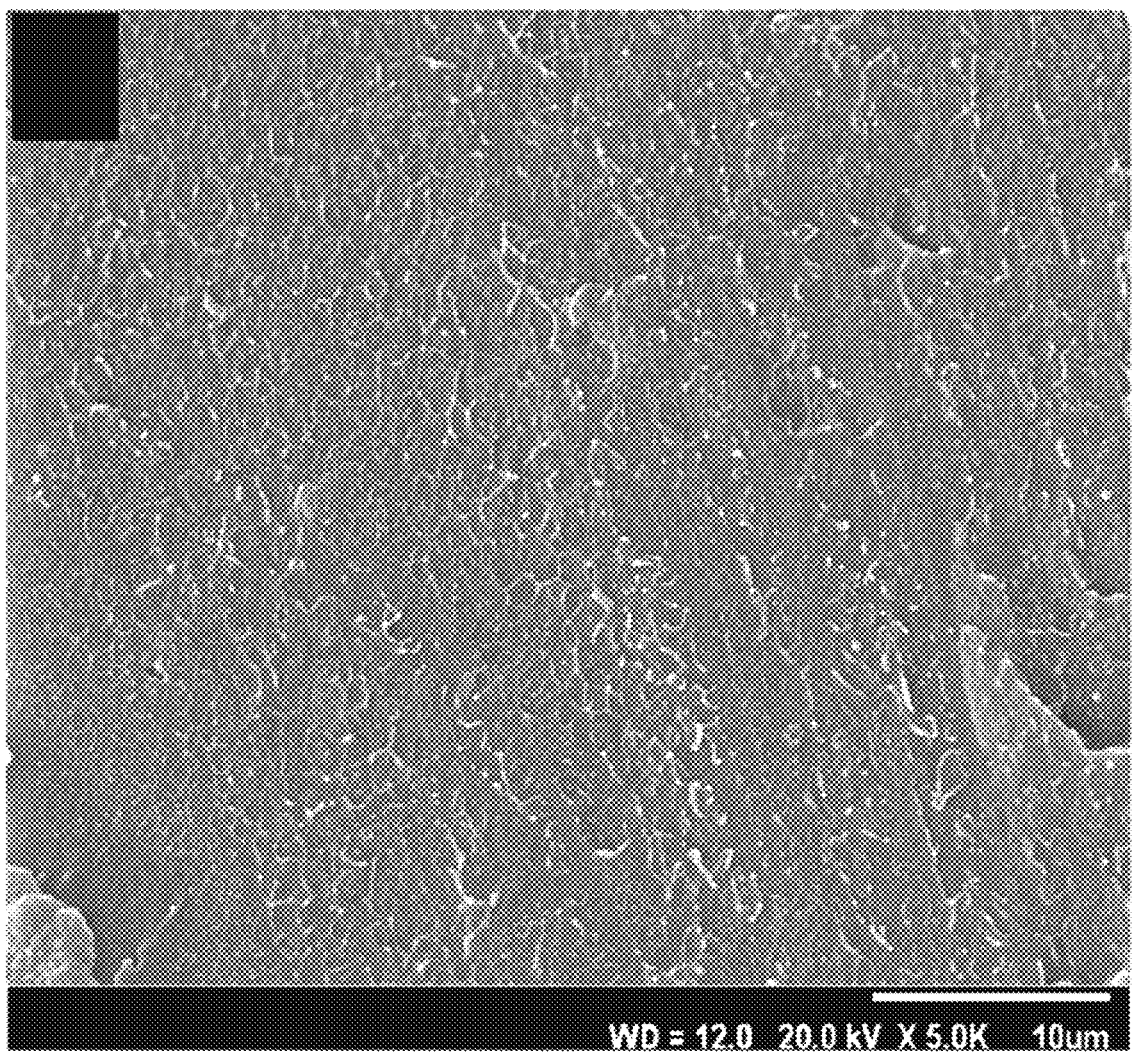
FIG. 6A illustrates a cross-sectional SEM image of an implementation of an $M_S$ membrane.
Figure 6B:
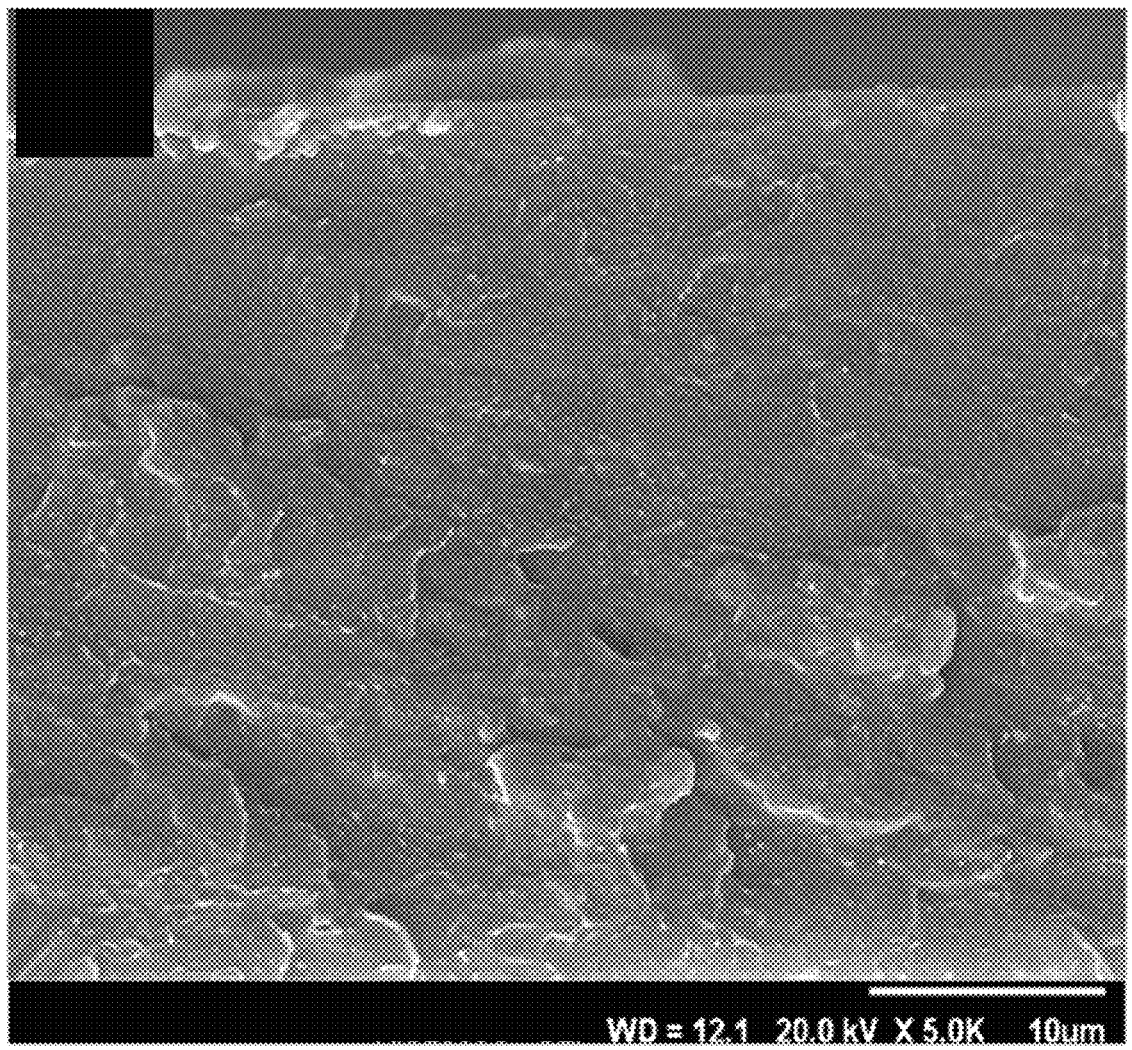
FIG. 6B illustrates a cross-sectional SEM image of an implementation of an $M_{SS}$ membrane.
Figure 6C:
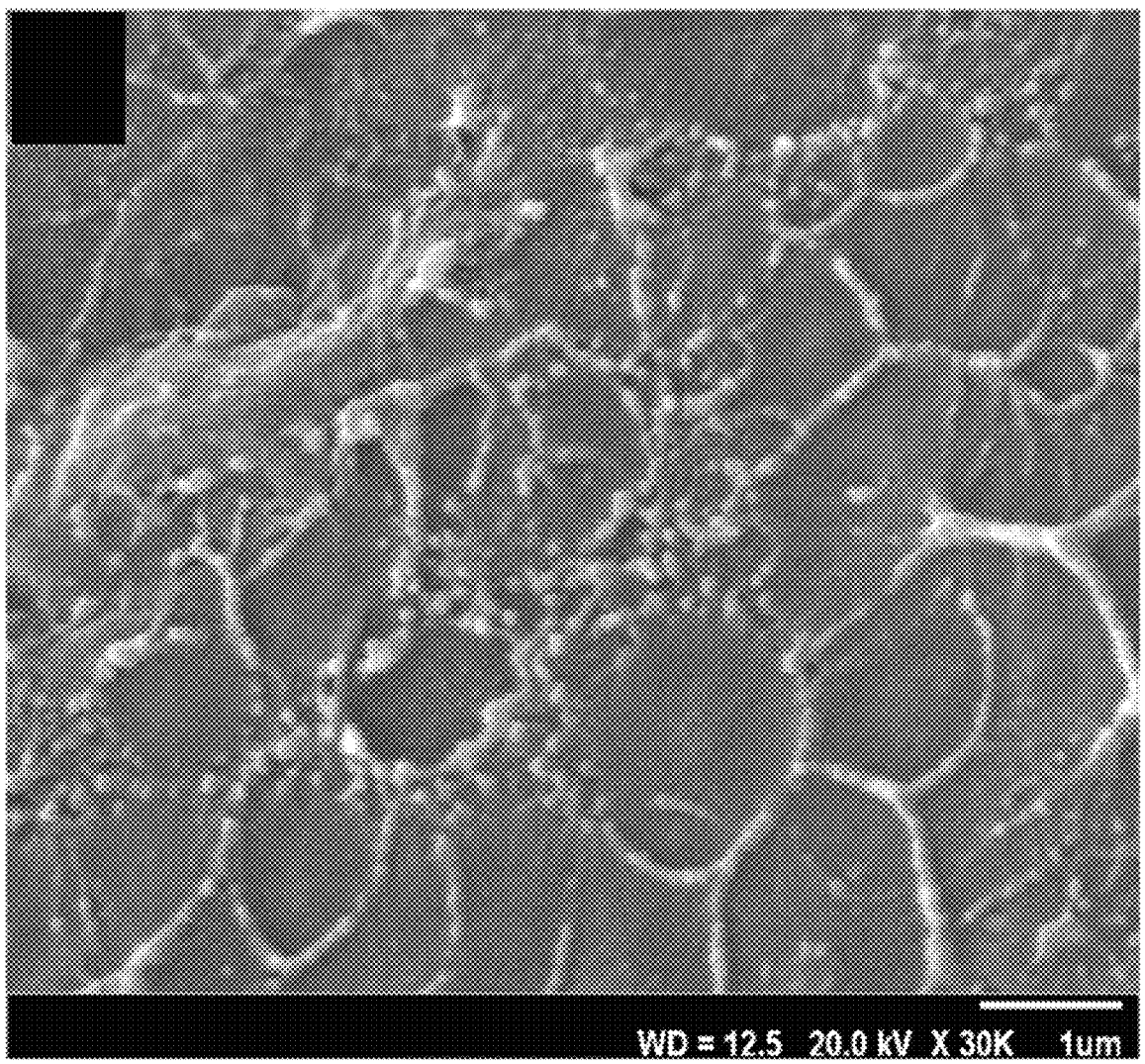
FIG. 6C illustrates a cross-sectional SEM image of an implementation of an $M_{SSW5}$ membrane.

Referring now to FIGS. 6A-6C, a series of cross-sectional SEM images of the $M_S$ membrane (FIG. 6A), the $M_{SS}$ membrane (FIG. 6B) and the $M_{SSW5}$ membrane (FIG. 6C) are presented. As shown in FIG. 6A, the pristine SPPEK membrane has a substantially smooth morphology without defects such as air bubbles. In addition, in FIG. 6B, the SPVDF-co-HFP and SPPEK polymers are blended substantially homogenously. Therefore, it can be understood that the interaction between the sulfonic acid groups of the polymers enhances the distribution of SPVDF-co-HFP in SPPEK.

Furthermore, FIG. 6C shows that after the dispersion of $SWO_3$ nanoparticles in the $M_{SS}$ blend membrane, the $SWO_3$ nanoparticles are detected in the polymer matrix. Homogenous distribution of $SWO_3$ nanoparticles may be due to the formation of strong hydrogen bonding between the sulfonic acid groups of nanoparticles and $SO_3H$ groups of polymers.

Figure 7:
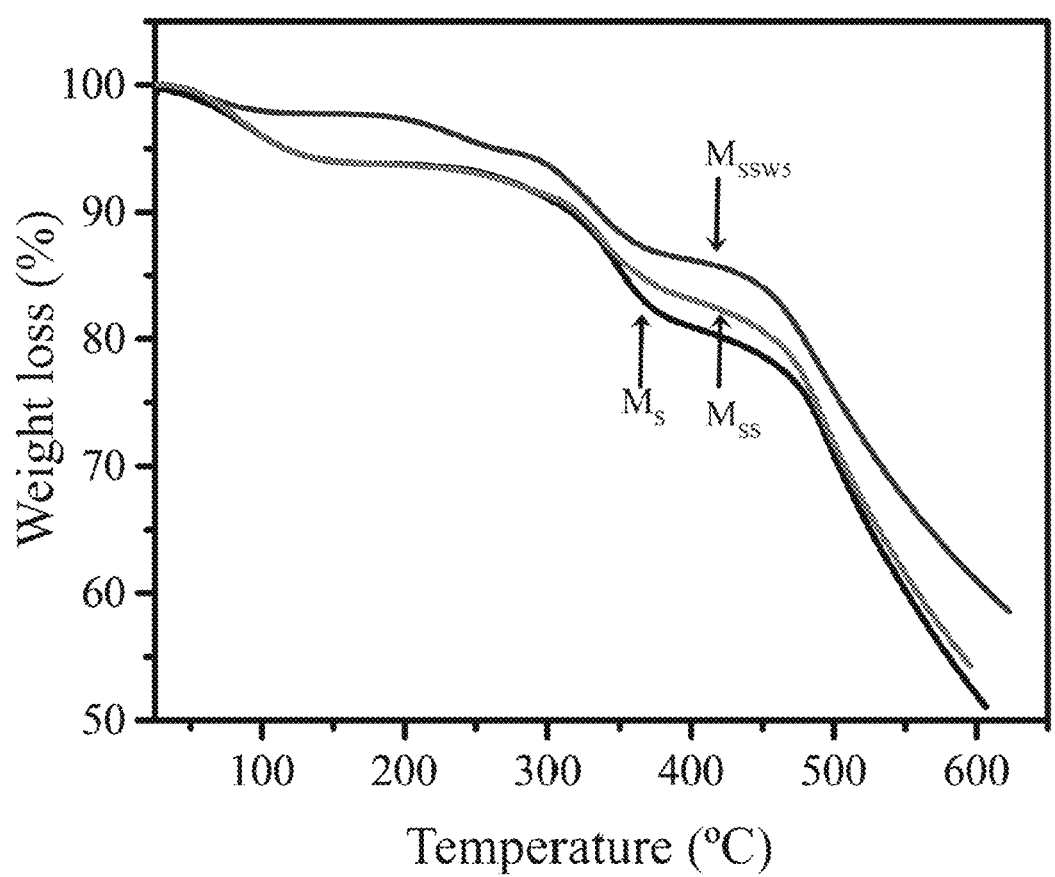
FIG. 7 illustrates a thermal gravimetric analysis (TGA) curves of implementations of $M_S$, $M_{SS}$ and $M_{SSW5}$ membranes.

Referring now to FIG. 7, the TGA curves of the $M_S$ membrane, the $M_{SS}$ membrane and the $M_{SSW5}$ membrane are shown. As shown in FIG. 7, the TGA curve of the $M_{SSW5}$ membrane shifted slightly toward a higher temperature compared to the $M_S$ and $M_{SS}$ membranes. This can occur because of the hydrogen bonding between $SO_3H$ groups of nanoparticles and sulfonated groups of polymer chains. The TGA curves of prepared membranes show the similar trend with three-step degradation patterns. The initial weight loss at below 200° C. is because of loss of residual solvent and absorbed water molecules. The second weight loss that occurred between 300 to 350° C. can be attributed to the loss of —$SO_3H$ groups of sulfonated polymers. The third weight loss initiated from 430° C. is ascribed to degradation of the backbone of sulfonated polymers matrix. The results shows different prepared membranes are thermally stable up to 300° C. and could meet the potential operation temperature in the DMFC condition.

In addition, the water uptake, membrane swelling, thermal and mechanical properties, methanol permeability, proton conductivity, selectivity and direct-methanol fuel cell (DMFC) performance of the nanocomposite blend membranes were investigated. The results of these investigations are presented in TABLE 1 below. The results demonstrate that the prepared membranes possessed relatively low methanol permeability, good dimensional and stability, and improved proton conductivity as well as selectivity. Presence of water molecules in the membrane facilitates the transfer of protons with both proton conducting mechanisms of Grotthus mechanism, which can be explained as the proton jump from one bound water molecule ($SO_3^{-H}{}_3O^+$) to the next molecule and Vehicle mechanism, which assume that the proton diffuses together with free water molecules by forming a complex ($H_3O^+$) and then diffuses intact. Thus, the hydrophobic nature of SPVDF-co-HFP decreases water uptake and membrane swelling of blend membranes. The addition of $SWO_3$ nanoparticles to the blend membranes increases the water uptake of the prepared membranes due to the formation of hydrogen bonding between the —$SO_3H$ groups of $SWO_3$ nanoparticles and free water molecules and also increase the hydrophilic nature of the membranes. The proton conductivity will increase by increasing water uptake because the mobility of protons in the water phase increases by increasing the water content. The proton conductivity of the $M_S$ membrane is attributed to the acid-base structure of SPPEK, which can help the sulfonated groups of polymer facilitate proton transfer more easily through the membrane by Grotthuss mechanism. Blending reaction in $M_{SS}$ membrane can reduce the proton conductivity by reducing the number of sulfonated groups in the blend membrane structure during the blending reaction. An average maximum proton conductivity of approximately 0.071 S cm$^{-1}$, was obtained from the $M_{SSW5}$ membrane at room temperature which is attributed to the hydrophilic nature of $SWO_3$ and the sulfonated groups of nanoparticles and polymers.

TABLE 1

Comparison of water uptake, membrane swelling, proton conductivity, methanol permeability and selectivity of the membranes

| Membrane | Water Uptake (%) | Membrane Swelling (%) | Proton Conductivity (S cm$^{-1}$) | Methanol Permeability (cm$^2$ s$^{-1}$) × 10$^{-7}$ | Selectivity (S s$^{-1}$ cm$^{-3}$) 10$^{-7}$ |
|---|---|---|---|---|---|
| $M_S$ | 18.9 | 10.5 | 0.039 | 3.21 | 12.14 |
| $M_{SS}$ | 18.1 | 9.5 | 0.030 | 1.31 | 22.90 |
| $M_{SSW3}$ | 24.9 | 14.0 | 0.055 | 1.22 | 45.08 |
| $M_{SSW5}$ | 26.2 | 18.3 | 0.071 | 0.95 | 74.73 |
| $M_{SSW7}$ | 27.5 | 18.6 | 0.064 | 0.90 | 71.11 |

As shown in TABLE 1, the proton conductivity of the nanocomposite membranes increases by increasing $SWO_3$ nanoparticles content until 5 wt % in the blend membrane. The sulfonic acid groups of $SWO_3$ nanoparticles can interact with free water molecules, forming a network of hydrogen bonds and increasing the proton conductivity of the nanocomposite membrane by Grotthus mechanism. In addition, the surface hydroxyl groups of $SWO_3$ nanoparticles can create hydrogen bondings with free water and increase proton conductivity via the Vehicle mechanism. The results of TABLE 1 show that proton conductivity of the $M_{SS}W_x$ membranes start to decrease when the amount of added $SWO_3$ nanoparticles is over 5 wt %, due to the obstruction of the same proton transport channels by added $SWO_3$ nanoparticles (blocking effect).

It should be understood that methanol permeability is a key consideration of the proton exchange membrane for DMFC application, since methanol crossover leads to a decrease in power density and fuel efficiency in DMFCs. The backbone of SPPEK polymer is less hydrophobic and the —$SO_3H$ group in the SPPEK structure is less acidic, which results in less hydrophilic/hydrophobic separation which further results in low methanol crossover in the $M_S$ membrane. Although the methanol permeability of SPPEK is acceptable for a DMFC application, further improvements can be made by blending with suitable polymers such as SPVDF-co-HFP. The hydrophobic nature of SPVDF-co-HFP, interaction between polymers, and low affinity towards methanol can decrease the methanol permeability of blend membranes. Also, the methanol permeability of $M_{SS}W_x$ membrane decreases by increasing the $SWO_3$ content. This can be attributed to the filling role of $SWO_3$ in the structure of the membrane and increasing the compaction structure of the $M_{SS}W_x$ membrane due to the formation of hydrogen bonding between functionalized groups of $SWO_3$ nanoparticles and sulfonated groups of polymers. As shown in TABLE 1 above, the nanocomposite blend membrane with 5 wt % of $SWO_3$ nanoparticles exhibited the highest proton conductivity and selectivity as compared to other prepared membranes. Therefore, the $M_{SSW5}$ membrane was selected for further analysis. Results of the analysis are presented below in TABLE 2.

TABLE 2

Mechanical properties of membranes at room temperature

| Membrane | Tensile Strength (MPa) | Elongation at Break (%) |
|---|---|---|
| $M_S$ | 45.50 | 10.8 |
| $M_{SS}$ | 48.01 | 10.2 |
| $M_{SSW3}$ | 52.43 | 8.5 |

Referring to TABLE 2 it can be seen that by blending SPPEK and SPVDF-co-HFP and adding $SWO_3$ nanoparticles, a compact structure of membranes with hydrogen bonding and improved mechanical properties may be obtained. Also, nitrogen moiety in the SPPEK provides adhesion between the polymer chains and nanoparticles which further results in improved mechanical properties of the $M_{SSW5}$ membrane. As shown in TABLE 2, the $M_{SSW5}$ membrane has improved properties compared to the $M_S$ and $M_{SS}$ membrane. SPPEK with many pendant phenyls and heterocyclic structures is a rigid polymer and has good mechanical stability. Blending of SPPEK and SPVDF-co-HFP in the $M_{SS}$ membrane improves mechanical stability of the blend membrane compared to the $M_S$ membrane, which is due to better mechanical properties of SPVDF-co-HFP and formation of hydrogen bonds between the sulfonated groups which lead to a more compact structure.

With further reference to TABLE 2, the $M_S$ and $M_{SS}$ membranes shows relatively similar Eb and the flexibility slightly decreases with the addition of $SWO_3$ nanoparticles to the blend membrane, which is because of decrease in the mobility of polymer chains with formation of hydrogen bonds and the compact structure of the membrane.

Figure 8:
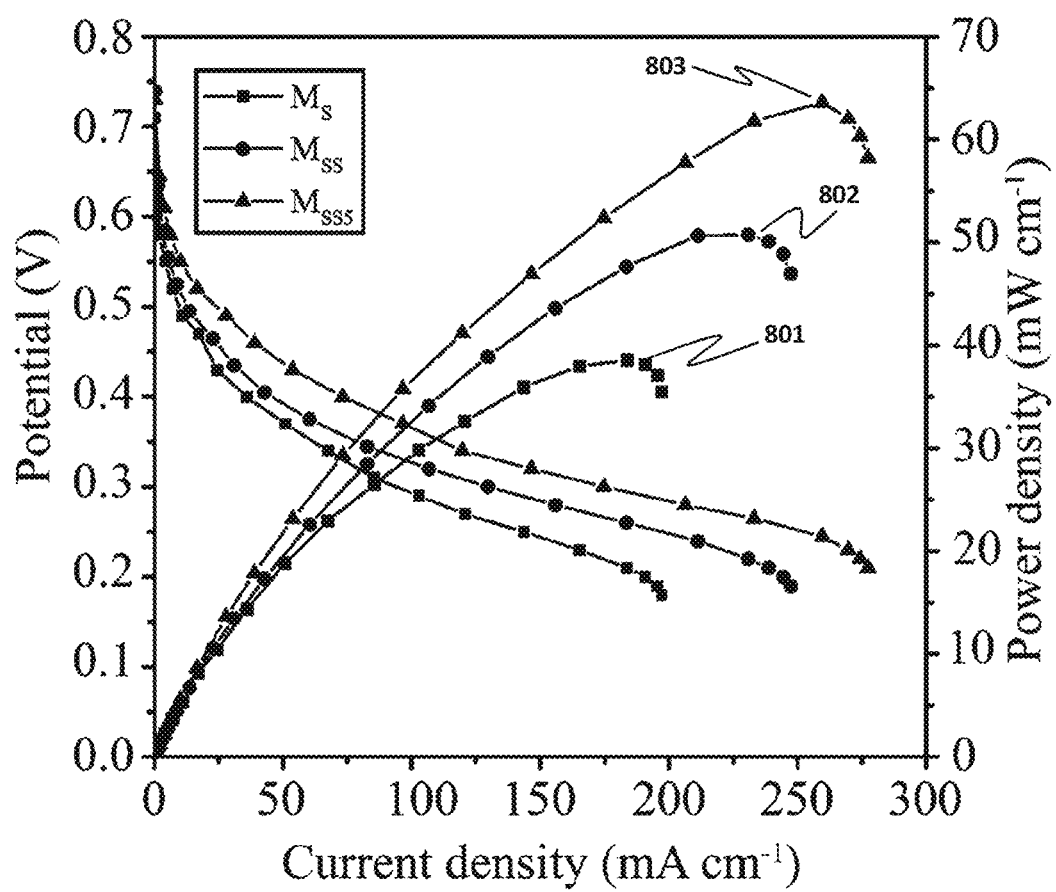
FIG. 8 illustrates a current density-potential (I-V) and power density curves of an implementation of a direct-methanol fuel cell (DMFC) assembled with different prepared membranes at room temperature.

Finally, FIG. 8 illustrates the current density-potential (I-V) and power density curves of the DMFC assembled with the various prepared membranes at approximately room temperature. Referring to FIG. 8, the maximum power density of a DMFC including an $M_{SSW5}$ nanocomposite blend membrane 803 (63.60 $mW/cm^2$) is greater than the maximum power density of a DMFC including an $M_{SS}$ membrane 802 (50.66 $mW/cm^2$) which is also greater than the maximum power density of a DMFC including an $M_S$ membrane 801 (38.55 $mW/cm^2$). This can be attributed to the higher water uptake and proton conductivity and lower methanol permeability of the $M_{SSW5}$ membrane. In other words, $SWO_3$ nanoparticles have catalytic properties for oxygen reaction reduction. The catalytic properties of $SWO_3$ nanoparticles increase the reaction kinetic of the interface surface of the membrane and electrode in MEA, and improve the performance of the DMFC containing $M_{SS}W_5$ membrane.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for fabricating a nanocomposite blend membrane, the method comprising:
   preparing sulfonated $WO_3$ nanoparticles;
   preparing a first solution of a first sulfonated polymer;
   preparing a second solution of a second sulfonated polymer;

preparing a third solution including the first solution, the second solution, and the sulfonated WO$_3$ nanoparticles; and casting the third solution to obtain a nanocomposite blend membrane.

2. The method according to claim 1, wherein preparing the sulfonated WO$_3$ nanoparticles includes:

mixing an ammonia solution and a first cetyltrimethylammonium bromide (CTAB) solution to obtain a primary solution;

adding tungsten hexachloride WCl$_6$ to a second CTAB solution to obtain a secondary solution;

mixing the primary solution and the secondary solution to obtain a tertiary solution; and aging the tertiary solution.

3. The method according to claim 2, wherein preparing the sulfonated WO$_3$ nanoparticles includes:

calcinating the aged tertiary solution to obtain WO$_3$ nanoparticles;

mixing the obtained WO$_3$ nanoparticles and dry dichloromethane in a vessel;

purging HCl gas into the vessel;

adding chlorosulfonic acid into the vessel; and reducing the pressure of the vessel to remove dichloromethane and to obtain a powder of SWO$_3$ nanoparticles.

4. The method according to claim 1, wherein preparing the first solution of the first sulfonated polymer includes the steps of:

adding poly (phthalazinone ether ketone) (PPEK) powder to concentrated sulfuric acid to obtain a PPEK sulfuric acid solution;

pouring the PPEK sulfuric acid solution into chilled water; and drying the PPEK sulfuric acid solution and chilled water solution to obtain dried sulfonated poly (phthalazinone ether ketone) (SPPEK).

5. The method according to claim 1, wherein preparing the second solution of the second sulfonated polymer includes the steps of:

drying Poly(vinylidene fluoride-co-hexafluoropropylene) (PVDF-co-HFP) pellets in a vacuum oven;

heating a solution of chlorosulfonic acid;

adding the dried PVDF-co-HFP pellets to the heated chlorosulfonic acid to obtain black pellets;

washing the black pellets; and vacuum drying the black pellets to obtain sulfonated Poly(vinylidene fluoride-co-hexafluoropropylene) (SPVDF-co-HFP).

6. The method according to claim 1, wherein preparing the third solution includes the steps of:

dissolving a first quantity of dried SPPEK in dimethylacetamide (DMAc) to obtain an SPPEK and DMAc solution;

dissolving a second quantity of SPVDF-co-HFP in DMAc separately to obtain an SPVDF-co-HFP and DMAc solution;

mixing the SPPEK and DMAc solution with the SPVDF-co-HFP and DMAc solution to obtain a blend polymer solution; and adding SWO$_3$ nanoparticles to the blend polymer solution, thereby obtaining an SPPEK/SPVDF-co-HFP/SWO$_3$ solution.

7. The method according to claim 6, wherein casting the third solution to obtain the nanocomposite blend membrane includes the steps of:

casting the SPPEK/SPVDF-co-HFP/SWO$_3$ solution onto a plate; and drying the SPPEK/SPVDF-co-HFP/SWO$_3$ solution casted onto the plate by:

first, drying the SPPEK/SPVDF-co-HFP/SWO$_3$ solution at approximately room temperature for a first period of time;

second, drying the SPPEK/SPVDF-co-HFP/SWO$_3$ solution at approximately 70° C. for a second period of time; and third, drying the SPPEK/SPVDF-co-HFP/SWO$_3$ solution at approximately 120° C. for a third period of time.

* * * * *